(12) United States Patent
Iizuka et al.

(10) Patent No.: US 11,175,380 B2
(45) Date of Patent: Nov. 16, 2021

(54) ESTIMATING DEVICE AND ESTIMATING METHOD

(71) Applicant: PANASONIC INTELLECTUAL PROPERTY MANAGEMENT CO., LTD., Osaka (JP)

(72) Inventors: Shoichi Iizuka, Osaka (JP); Takeshi Nakayama, Hyogo (JP); Naoki Honma, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 381 days.

(21) Appl. No.: 16/351,119

(22) Filed: Mar. 12, 2019

(65) Prior Publication Data
US 2020/0011967 A1 Jan. 9, 2020

(30) Foreign Application Priority Data

Jul. 3, 2018 (JP) .............................. JP2018-126819
Dec. 5, 2018 (JP) .............................. JP2018-228295

(51) Int. Cl.
*G01S 7/295* (2006.01)
*G01S 13/68* (2006.01)

(52) U.S. Cl.
CPC .............. *G01S 7/295* (2013.01); *G01S 13/68* (2013.01)

(58) Field of Classification Search
None
See application file for complete search history.

(56) References Cited

U.S. PATENT DOCUMENTS

| 7,106,689 B1 | 9/2006 | Sudo |
| 2004/0000663 A1 | 4/2004 | Poullin |

(Continued)

FOREIGN PATENT DOCUMENTS

| JP | 2001-144722 | 5/2001 |
| JP | 2004-531701 A | 10/2004 |

(Continued)

OTHER PUBLICATIONS

Japan Office Action, dated Sep. 23, 2020, for the corresponding Japanese Patent Application No. 2019-157958.

*Primary Examiner* — Whitney Moore
(74) *Attorney, Agent, or Firm* — Greenblum & Bernstein, P.L.C.

(57) ABSTRACT

An estimating device includes: a transmission antenna; a transmission signal generator that generates a multicarrier signal; a transmitter that outputs the multicarrier signal to the transmission antenna; a reception antenna; a receiver that measures reception signals including a reflected signal which is the transmitted multicarrier signal that has been reflected or dispersed by the moving body; a complex transfer function calculator that calculates, from the measured reception signals, a plurality of complex transfer functions indicating propagation characteristics between a transmission antenna element and a reception antenna element; a moving body correlation matrix calculator that calculates, for each of subcarriers, a moving body correlation matrix from the complex transfer functions; a subcarrier integrator that integrates the moving body correlation matrices; and an estimation processor that estimates the direction or position in which the moving body is present, using the integrated moving body correlation matrix obtained by the integration.

9 Claims, 7 Drawing Sheets

(56) References Cited

U.S. PATENT DOCUMENTS

| | | | |
|---|---|---|---|
| 2006/0115011 A1 | 6/2006 | Tsuruta et al. | |
| 2017/0205502 A1 | 7/2017 | Honma et al. | |
| 2018/0011169 A1 | 1/2018 | Nakayama et al. | |
| 2019/0195997 A1* | 6/2019 | Iizuka | G01S 7/411 |
| 2019/0339379 A1* | 11/2019 | Iizuka | G01S 13/003 |
| 2020/0011988 A1* | 1/2020 | Nakayama | G01S 13/58 |
| 2021/0215789 A1* | 7/2021 | Hu | G01S 13/56 |

FOREIGN PATENT DOCUMENTS

| | | |
|---|---|---|
| JP | 2006-157663 | 6/2006 |
| JP | 2012-088279 | 5/2012 |
| JP | 2012-137340 | 7/2012 |
| JP | 2015-117972 | 6/2015 |
| JP | 2017-129558 | 7/2017 |
| JP | 2018-008021 | 1/2018 |

* cited by examiner

ESTIMATING DEVICE AND ESTIMATING METHOD

CROSS REFERENCE TO RELATED APPLICATION

This application claims the benefit of priority of Japanese Patent Application Number 2018-126819 filed on Jul. 3, 2018 and Japanese Patent Application Number 2018-228295 filed on Dec. 5, 2018, the entire contents of which are hereby incorporated by reference.

BACKGROUND

1. Technical Field

The present disclosure relates to an estimating device and an estimating method for estimating a direction or a position of a moving body by using radio signals.

2. Description of the Related Art

A method that uses radio signals is being considered as a method for knowing the position of a person (see for example, Japanese Unexamined Patent Application. Publication No. 2015-117972 (Patent Literature (PTL) Japanese Unexamined. Patent Application Publication No. 2017-129558 (PTL 2), Japanese Unexamined Patent Application Publication No. 2018-008021 (PTL 3), Japanese Unexamined Patent Application Publication No. 2012-088279 (PTL 4), Japanese Unexamined Patent Application. Publication No. 2012-137340 (PTL 5), Japanese Unexamined Patent Application Publication No. 2006-157663 (PTL 6), and Japanese Unexamined Patent Application Publication No. 2001-144722 (PTL 7)). PTL 1, 2, and 3 disclose techniques of estimating the position and state of a person that is a detection target by analyzing a component including a Doppler shift using difference calculation. PTL 4 and 5 disclose Doppler sensors that use orthogonal frequency division multiplexing (OFDM) signals.

SUMMARY

With the conventional methods, it is difficult to more accurately estimate the direction or the position of a moving body relative to an own device.

In order to solve the aforementioned problem, an estimating device according to an aspect of the present disclosure is an estimating device that estimates a direction or a position in which a moving body is present, and includes: a transmission antenna including M transmission antenna elements, where M is a natural number greater than or equal to 1, and M is greater than or equal to 2 when N is 1; a transmission signal generator that generates a multicarrier signal obtained by modulating a plurality of subcarrier signals; a transmitter that causes the transmission antenna to transmit the signal, by outputting the multicarrier signal to the transmission antenna; a reception antenna including N reception antenna elements, where N is a natural number greater than or equal to 1, and N is greater than or equal to 2 when M is 1; a receiver that measures, for a first period equivalent to a cycle of movement by the moving body, a plurality of reception signals which are received by each of the N reception antenna elements and include a reflected signal which is the multicarrier signal transmitted from each of the M transmission antenna elements that has been reflected or dispersed by the moving body; a complex transfer function calculator that calculates a plurality of complex transfer functions for each of a plurality of subcarriers to which the plurality of subcarrier signals correspond, using the plurality of reception signals measured by the receiver in the first period, the plurality of complex transfer functions indicating a propagation characteristic between a transmission antenna element and a reception antenna element in each of M×N combinations obtainable when the NI transmission antenna elements and the N reception antenna elements are combined on a one-to-one basis; a moving body correlation matrix calculator that calculates, for each of the plurality of subcarriers, a moving body correlation matrix having M rows×N columns by (i) recording sequentially in tune series, which is an order in which the plurality of reception signals are measured, the plurality of complex transfer functions calculated by the complex transfer function calculator and (ii) extracting components relating to the moving body from the plurality of complex transfer functions recorded sequentially in time series, the (i) recording and the (ii) extracting being performed for each of the plurality of subcarriers and each of the M×N combinations; a subcarrier integrator that calculates an integrated moving body correlation matrix by integrating, according to a predetermined method, the plurality of moving body correlation matrices calculated for the plurality of subcarriers; and an estimation processor that estimates the direction or the position in which the moving body is present relative to the estimating device, using the integrated moving body correlation matrix calculated by the subcarrier integrator.

Furthermore, an estimating device according to another aspect of the present disclosure is an estimating device that estimates a direction or a position in which a moving body is present, and includes: a transmission antenna including M transmission antenna elements, where M is a natural number greater than or equal to 1, and M is greater than or equal to 2 when N is 1; a transmission signal generator that generates a transmission signal; a transmitter that causes the transmission antenna to transmit the transmission signal, by outputting the transmission signal to the transmission antenna; a reception antenna including N reception antenna elements, where N is a natural number greater than or equal to 1, and N is greater than or equal to 2 when M is 1; a receiver that measures, for a first period equivalent to a cycle of movement by the moving body, a plurality of reception signals which are ti received by each of the N reception antenna elements and include a reflected signal which is the transmission signal transmitted from each of the M transmission antenna elements that has been reflected or dispersed by the moving body; a complex transfer function calculator that calculates, using the plurality of reception signals measured by the receiver in the first period, a plurality of complex transfer functions indicating a propagation characteristic between a transmission antenna element and a reception antenna element in each of M×N combinations obtainable when the M transmission antenna elements and the N reception antenna elements are combined on a one-to-one basis; a moving body correlation matrix calculator that calculates a moving body correlation matrix having M rows×N columns by (i) recording sequentially in time series, which is an order in which the plurality of reception signals are measured, the plurality of complex transfer functions calculated by the complex transfer function calculator, (ii) calculating an average value of the plurality of complex transfer functions recorded sequentially in time series in a second period, and subtracting the average value from each of the plurality of complex transfer functions in the second period, the (i) recording, the (ii) calculating, and the subtracting being performed for each of the M×N combinations; and an estimation processor that estimates the direction or the position in which the moving body is present relative to the estimating device, using the moving body correlation matrix calculated by the moving body correlation matrix calculator.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

According to the present disclosure, it is possible to more accurately estimate the direction or the position of a moving body relative to an own device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
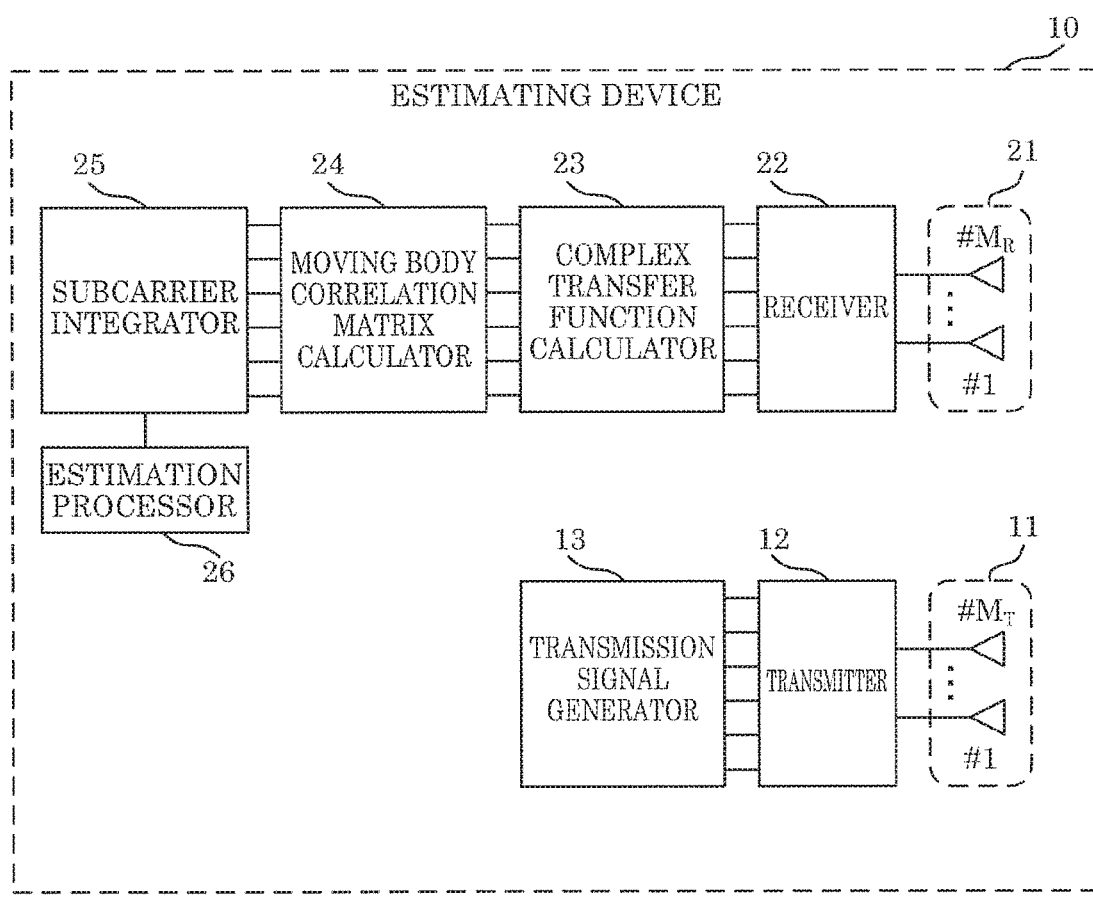
FIG. 1 is a block diagram illustrating an example of a configuration of an estimating device according to an embodiment.

DETAILED DESCRIPTION OF THE EMBODIMENT (Underlying Knowledge Forming the Basis of the Present Disclosure)

A method that uses radio signals is being considered as a method for knowing the position of a person.

For example, PTL 1 and 2 disclose transmitting a radio signal over a predetermined area, receiving, using an antenna, the radio signal reflected by a detection target, and estimating a complex transfer function between transmission and reception antennas. A complex transfer function is a function of a complex number representing a relationship between input and output, and, here, represents propagation characteristics between transmission and reception antennas. The number of components of the complex transfer function is equivalent to the product of the number of transmission antennas and the number of reception antennas.

In addition, PTL 3 discloses estimating the posture of a living body by using a radar cross-section (RCS) calculated from received power, with the same configuration as in PTL 2. RCS is an index indicating the area of an object that reflected a transmission wave, and the RCS of a living body changes in various ways according to the posture.

PTL 1 discloses that it is possible to know the position or state of a person that is a detection target by analyzing a component including a Doppler shift, using Fourier transform. More specifically, the temporal change of an element of a complex transfer function is recorded, and the temporal waveform thereof is Fourier-transformed. A biological activity such as the respiration or heartbeat of a living body such as a person exerts a small Doppler effect on the reflected wave. Therefore, a component including a Doppler shift includes the influence of the biological activity of the person. On the other hand, a component that has no Doppler shift is a component that is not influenced by the biological activity of the person, that is, a component corresponding to a reflected wave from a fixed object or a direct wave between transmission and reception antennas. Specifically, PTL 1 discloses that it is possible to know the position or state of a person that is a detection target, by using a component included in a predetermined frequency range in a Flourier-transformed waveform.

PTL 2 discloses a method of recording a temporal change in an element of a complex transfer function, and extracting a component including a small Doppler shift including the influence of a living body by analyzing difference information of the temporal change. Specifically, PTL 2 discloses that it is possible to know the position or state of a person that is a detection target by using the difference information.

In contrast, PTL 3 discloses an orthogonal frequency division multiplexing (OFDM) Doppler radar that transmits a pulse using an OFDM signal, and detects a Doppler shift caused by a traveling body that is a detection target. Furthermore, PTL 4 discloses, with regard to an OFDM Doppler radar, a high-speed processing method that does not require Fourier transform.

Furthermore, PTL 6 and 7 disclose techniques for improving the accuracy of estimation of complex transfer functions between transmission and reception antennas, by transmitting an OFDM signal. PTL 5 discloses that received noise components can be reduced by averaging complex transfer functions on a subcarrier basis, and PTL 7 discloses that received noise components can be reduced by selecting a subcarrier having the maximum reception power.

However, in the methods in PTL 1, 2, and 3, non-modulated waves are used as transmission signals, and thus it is difficult to make use of commercially available devices, and dedicated hardware is required. Specifically, it is difficult to use communication devices that are currently widely used, and thus a user needs to additionally provide dedicated hardware aside from an existing communication device.

Furthermore, in order to obtain sufficient accuracy with the methods in PTL 4 and 5, it is necessary to make pulses steep, which requires a wide frequency band. As such, the cost of hardware is more expensive compared to communication devices for public use.

Furthermore, when the complex transfer function estimating methods using OFDM signals in PTL 6 and 7 are applied to a living body radar, high-accuracy estimation cannot be performed because averaging the complex transfer function of each OFDM subcarrier cancels out the living body component included in noise.

In view of the above, the inventors arrived at inventing, with high accuracy and low cost by using an existing transmission device, an estimating device, etc., capable of more accurately estimating the direction or position in which a moving body is present relative to the estimating device, using a multicarrier signal represented by an OFDM signal.

Specifically, an estimating device according to an aspect of the present disclosure is an estimating device that estimates a direction or a position in which a moving body is present, and includes: a transmission antenna including M transmission antenna elements, where M is a natural number greater than or equal to 1, and M is greater than or equal to 2 when N is 1; a transmission signal generator that generates a multicarrier signal obtained by modulating a plurality of subcarrier signals; a transmitter that causes the transmission antenna to transmit the multicarrier signal, by outputting the multicarrier signal to the transmission antenna; a reception antenna including N reception antenna elements, where N is a natural number greater than or equal to 1, and N is greater than or equal to 2 when M is 1; a receiver that measures, for a first period equivalent to a cycle of movement by the moving body, a plurality of reception signals which are received by each of the N reception antenna elements and include a reflected signal which is the multicarrier signal transmitted from each of the M transmission antenna elements that has been reflected or dispersed by the moving body; a complex transfer function calculator that calculates a plurality of complex transfer functions for each of a plurality of subcarriers to which the plurality of subcarrier signals correspond, using the plurality of reception signals measured by the receiver in the first period, the plurality of complex transfer functions indicating, a propagation characteristic between a transmission antenna element and a reception antenna element in each of M×N combinations obtainable when the M transmission antenna elements and the N reception antenna elements are combined on a one-to-one basis; a moving body correlation matrix calculator that calculates, for each of the plurality of subcarriers, a moving body correlation matrix having M rows×N columns by (i) recording sequentially in time series, which is an order in which the plurality of reception signals are measured, the plurality of complex transfer functions calculated by the complex transfer function calculator and GO extracting components relating to the moving body from the plurality of complex transfer functions recorded sequentially in time series, the (i) recording and the (ii) extracting being performed for each of the plurality of subcarriers and each of the M×N combinations; a subcarrier integrator that calculates an integrated moving body correlation matrix by integrating, according to a predetermined method, the plurality of moving body correlation matrices calculated for the plurality of subcarriers; and an estimation processor that estimates the direction or the position in which the moving body is present relative to the estimating device, using the integrated moving body correlation matrix calculated by the subcarrier integrator.

According to this configuration, by using a multicarrier signal for the transmission signal, it is possible to make use of an existing communication device to estimate the direction or position of a moving body such as a living body relative to the estimating device.

Furthermore, in the estimating device, the direction or position in which the living body is present relative to the estimating device is estimated using an integrated moving body correlation matrix obtained by integrating the plurality of moving body correlation matrices obtainable for the plurality of subcarriers. As such, compared to when a single subcarrier is used, highly accurate living body position estimation, is possible.

Furthermore, the moving body correlation matrix calculator may calculate at least two pieces of difference information each indicating a difference between two complex transfer functions at two time points of a predetermined interval, among the plurality of complex transfer functions recorded sequentially in time series for each of the plurality of subcarriers and each of the M×N combinations, and calculate the moving body correlation matrix using the at least two pieces of difference information calculated.

Accordingly, by obtaining the average of two or more pieces of difference information, it is possible to weaken the influence of instantaneous noise, and thus the accuracy of direction or position estimation can be improved.

Furthermore, the moving body correlation matrix calculator may calculate an average value of the plurality of complex transfer functions recorded sequentially in time series for each of the plurality of subcarriers and each of the M×N combinations, in a second period, subtract the average value from each of the plurality of complex transfer functions in the second period, and calculate the moving body correlation matrix using a subtraction result that is obtained.

Accordingly, it is possible to calculate the moving body correlation matrix using simple calculation such as averaging and subtraction, without having to perform complex calculations such as Fourier transform, a plurality of difference calculations, etc. As such, the processing load for calculating a moving body correlation matrix can be reduced.

Furthermore, the subcarrier integrator may calculate the integrated moving body correlation matrix by calculating a per subcarrier average for the plurality of moving body correlation matrices calculated for the plurality of subcarriers.

Accordingly, by calculating a per subcarrier average of the moving body correlation matrices, instead of the average of complex transfer functions that may cancel out the fluctuation of the living body, the moving body information included in the moving body correlation matrices of the respective subcarriers are superposed and processed all at once by the estimation processor disposed at a subsequent stage using the integrated moving body correlation matrix. Accordingly, according to calculations, matrix rank can be restored, and thus the calculation result, that is, direction or position estimation accuracy can be improved.

Furthermore, the subcarrier integrator may calculate the integrated moving body correlation matrix by calculating a median of each set of corresponding components among the plurality of moving body correlation matrices calculated for the plurality of subcarriers.

As such, the plurality of moving body correlation, matrices corresponding to the plurality of subcarriers can be easily integrated.

Furthermore, the multicarrier signal may be an orthogonal frequency division multiplexing (OFDM) signal.

Furthermore, an estimating device according to another aspect of the present disclosure is an estimating device that estimates a direction or a position in which a moving body is present, and includes: a transmission antenna including M transmission antenna elements, where M is a natural number greater than or equal to 1, and M is greater than or equal to 2 when N is 1; a transmission signal generator that generates a transmission signal; a transmitter that causes the transmission antenna to transmit the transmission signal, by outputting the transmission signal to the transmission antenna; a reception antenna including N reception antenna elements, where N is a natural number greater than or equal to 1, and N is greater than or equal to 2 when M is 1; a receiver that measures, for a first period equivalent to a cycle of movement by the moving body, a plurality of reception signals which are received by each of the N reception antenna elements and include a reflected signal which is the transmission signal transmitted from each of the M transmission antenna elements that has been reflected or dispersed by the moving body; a complex transfer function calculator that calculates, using the plurality of reception signals measured by the receiver in the first period, a plurality of complex transfer functions indicating a propagation characteristic between a transmission antenna element and a reception antenna element in each of M×N combinations obtainable when the M transmission antenna elements and the N reception antenna elements are combined, on a one-to-one basis; a moving body correlation matrix calculator that calculates a moving body correlation matrix having M rows×N columns by (i) recording sequentially in time series, which is an order in which the plurality of reception signals are measured, the plurality of complex transfer functions calculated by the complex transfer function calculator, (ii) calculating an average value of the plurality of complex transfer functions recorded sequentially in time series in a second period, and subtracting the average value from each of the plurality of complex transfer functions in the second period, the (i) recording, the (ii) calculating, and the (iii) subtracting being performed for each of the M×N combinations; and an estimation processor that estimates the direction or the position in which the moving body is present relative to the estimating device, using the moving body correlation matrix calculated by the moving body correlation matrix calculator.

It should be noted that these general and specific aspects may be implemented using a system, a method, an integrated circuit, a computer program, or a computer-readable recording medium such as a CD-ROM, or any combination of systems, methods, integrated circuits, computer programs, or recording media.

Hereinafter, exemplary embodiments of the present disclosure will be described in detail with reference to the Drawings. It should be noted that each of the exemplary embodiments described hereinafter illustrate a specific example of the present invention. The numerical values, shapes, materials, structural components, the arrangement and connection of the structural components, steps, the processing order of the steps, etc., shown in the following exemplary embodiments are mere examples, and are therefore not intended to limit the present disclosure. Furthermore, among the structural components in the following exemplary embodiments, components not recited in any one of the independent claims defining the most generic concept of the present disclosure are described as optional components making up a more preferable form. It should be noted that in the Specification and the Drawings, structural components having substantially the same functional configuration are given the same numerical sign in order to omit overlapping descriptions.

Embodiment

Hereinafter, a method in which the position of a moving body (living body) that is a detection target is estimated by estimating device 10 according to an exemplary embodiment will be described with reference to the drawings.

[Configuration of Estimating Device 10]

Figure 2:
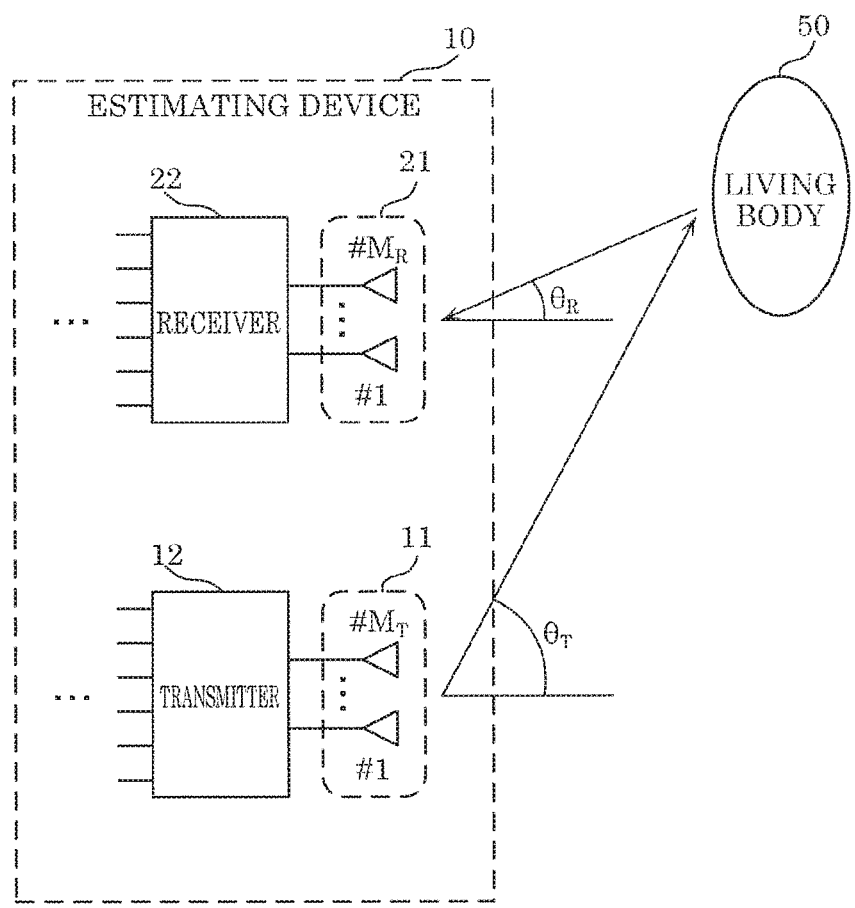
FIG. 2 is a diagram illustrating an example of a detection target of the estimating device illustrated in FIG. 1.

FIG. 1 is a block diagram illustrating an example of a configuration of estimating device 10 in an exemplary embodiment. FIG. 2 is a diagram illustrating an example of a detection target of estimating device 10 illustrated in FIG. 1.

Estimating device 10 illustrated in FIG. 1 includes transmission antenna 11, transmitter 12, transmission signal generator 13, reception antenna 21, receiver 22, complex transfer function calculator 23, moving body correlation matrix calculator 24, subcarrier integrator 25, and estimation processor 26. Estimating device 10 estimates the position of living body 50, which is a moving body, relative to estimating device 10.

[Transmission Antenna 11]

Transmission antenna 11 includes M transmission antenna elements. Here, M is a natural number greater than or equal to 1. It should be noted that when N, which is the number of reception antenna elements to be described later, is 1, M is a natural number greater than or equal to 2. In this embodiment, transmission antenna 11 includes $M_T$ transmission antenna elements, where $M_T$ is a natural number greater than or equal to 2. Specifically, transmission antenna 11 includes a transmission array antenna consisting of $M_T$ transmission antenna elements. Each of the $M_T$ transmission antenna elements transmits a multicarrier signal (transmission wave) generated by transmitter 12 to be described later.

[Transmission Signal Generator 13]

Transmission signal generator 13 generates a multicarrier signal obtained by modulating a plurality of subcarrier signals. Specifically, transmission signal generator 13 generates a plurality of subcarrier signals corresponding to a plurality of subcarriers having mutually different frequency bands, and generates a multicarrier signal by multiplexing the generated plurality of subcarriers. In this embodiment, transmission signal generator 13 is exemplified as generating, as a multicarrier signal, an OFDM signal which has a high frequency band utilization efficiency and consists of S subcarriers. However, aside from generating an OFDM signal in which respective subcarriers are orthogonal, other multicarrier signals such as a simple frequency division multiplexing (FDM) signal may be generated as long as it is a multicarrier signal obtainable by multicarrier modulation.

Furthermore, the signal generated by transmission signal generator 13 may be a signal that is shared with a signal used for communication.

[Transmitter 12]

Transmitter 12 adds appropriate processing to the signal generated by transmission signal generator 13, to generate a transmission wave. The processing carried out here includes, for example, up-conversion in which the signal is converted from the intermediate frequency (IF) frequency band to the radio frequency (RF) frequency band, amplification in which the signal is amplified to the appropriate transmission level, etc. Then, as illustrated in FIG. 2, transmitter 12 outputs the processed multicarrier signal to transmission antenna 11 to thereby cause transmission antenna 11 to transmit the multicarrier signal. With this, the multicarrier signal is transmitted from each of the $M_T$ transmission antenna elements included in transmission antenna 11.

[Reception Antenna 21]

Reception antenna 21 includes N reception antenna elements. Here, N is a natural number greater than or equal to 1. It should be noted that, when M, which is the number of transmission antenna elements, is 1, N is a natural number greater than or equal to 2, in this embodiment, reception antenna 21 includes $M_R$ reception antenna elements, where $M_R$ is a natural number greater than or equal to 2). Specifically, reception antenna 21 includes a reception array antenna consisting of Ma reception antenna elements. For example, as illustrated in FIG. 2, each of the $M_R$ reception antenna elements receive the signals that were transmitted by the respective NIT transmission antenna elements and reflected by living body 50 (reception signals),

[Receiver 22]

Receiver 22 measures, for a first period equivalent to a movement cycle of the moving body, the reception signals received by the respective. N reception antenna elements and which include reflected signals which are the multicarrier signals transmitted by the M transmission antenna elements that have been reflected or dispersed by the moving body. Here, the moving body is living body 50 illustrated in FIG. 2. The cycle of the movement of the moving body is, for example, equivalent to a cycle derived from an activity of living body 50. Furthermore, the cycle derived from an activity of living body 50 is a living body-derived cycle (living body fluctuation cycle) including at least one of respiration, heartbeat, and body motion of living body 50.

Receiver 22 converts the high-frequency signals received by the $M_R$ reception antenna elements into low-frequency signals on which signal processing can be performed. Then, receiver 22 demodulates each of the $M_R$ OFDM signals into S subcarrier signals. Each of the S subcarrier signals is represented by an IQ symbol. Receiver 22 outputs, to complex transfer function calculator 23, the S×$M_R$ sets of subcarrier signals obtained by converting the high-frequency signals received by the respective Me reception antenna elements, for at least the first period. It should be noted that, receiver 22 may continue to measure the reception signals already recorded by reception antenna 21, and continuously or periodically transmit the S×$M_R$ sets of subcarrier signals to complex transfer function calculator 23.

[Complex Transfer Function Calculator 23]

Complex transfer function calculator 23, using the reception signals measured in the first period by receiver 22, calculates, for each of the subcarriers to which the subcarrier signals correspond, a plurality of complex transfer functions indicating propagation characteristics between a transmission antenna element and a reception antenna element in each of M N combinations obtainable when the $M_T$ transmission antenna elements and the NR reception antenna elements are combined on a one-to-one basis.

In this embodiment, complex transfer function calculator 23 calculates, using the S×$M_R$ sets of subcarrier signals transmitted from receiver 22, complex transfer functions indicating the propagation characteristics between each of the transmission antenna elements and each of the reception antenna elements, for each of the S subcarrier signals. Hereinafter, a method of calculating complex transfer functions for one subcarrier signal out of the S×$M_R$, sets of subcarrier signals will be specifically described with reference to FIG. 2 and FIG. 3. Specifically, the complex transfer function calculation method described below is performed in the same manner for each of the S×$M_R$ sets of subcarrier signals.

Figure 3:
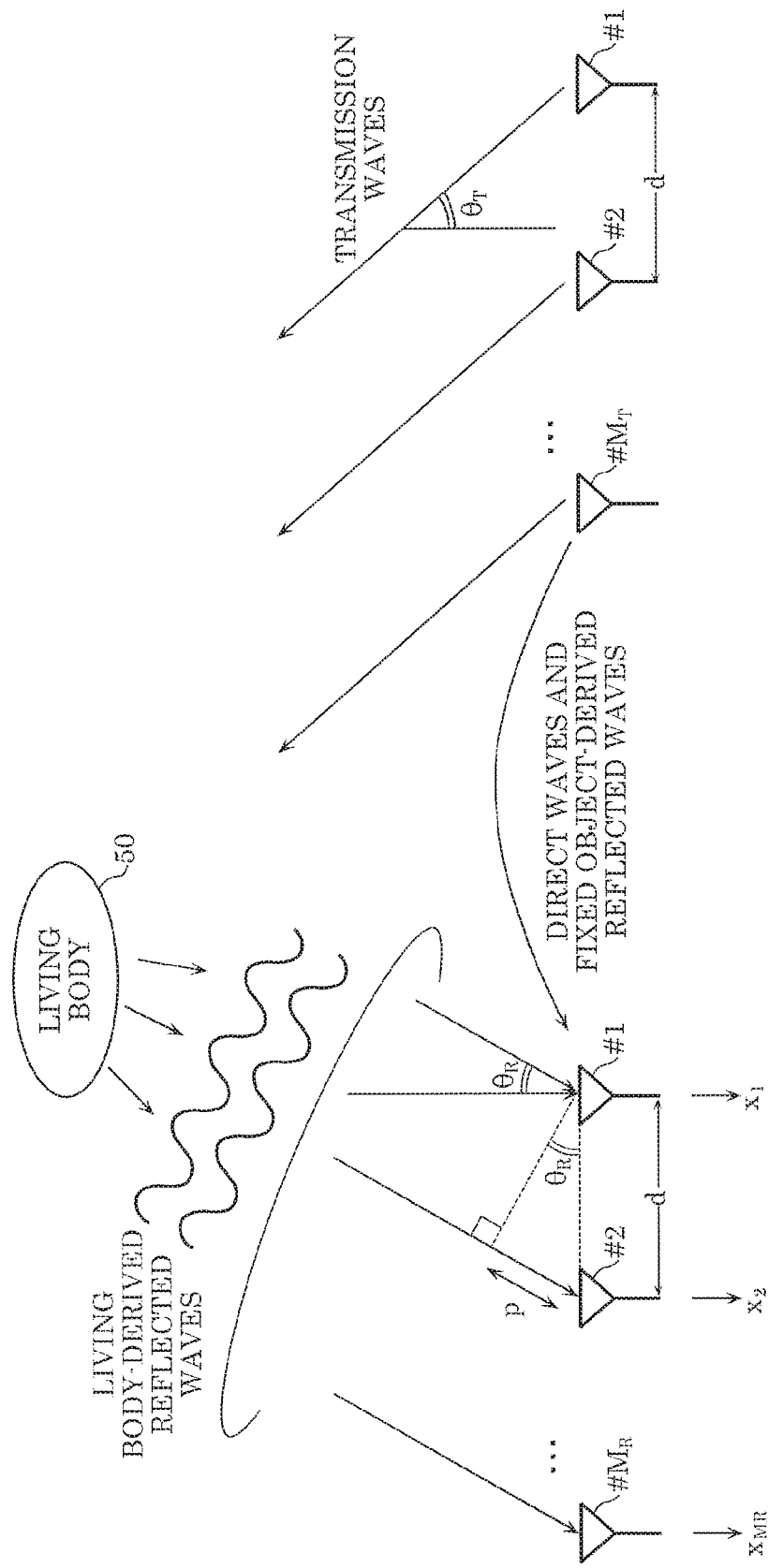
FIG. 3 is a diagram conceptually illustrating the transfer of signal waves of an antenna illustrated in FIG. 1.

In FIG. 2 and FIG. 3, the transmission array antenna consisting of the transmission antenna elements of transmission antenna 11 and the reception array antenna consisting of the reception antenna elements of reception antenna 21 are both linear arrays with element interval d. Furthermore, the direction of living body 50 as seen from the front of the transmission array antenna is assumed to be $\theta_T$, and the direction of living body 50 as seen from the front of the reception array antenna is assumed to be $\theta_R$. The distance between living body 50 and the transmission array antenna and the distance between living body 50 and the reception array antenna is assumed to be sufficiently larger compared to the aperture widths of the respective array antennas, and the transmission wave departing from the transmission array antenna and the reflected wave that passed through the living body arriving at the reception array antenna are considered to be plane waves.

As illustrated in FIG. 2 and FIG. 3, the transmission wave transmitted from the $M_T$ transmission antenna elements of transmission antenna 11 at an angle $\theta_T$ is reflected by living body 50 and arrives at the reception array antenna at an angle $\theta_R$.

In this case, complex transfer function calculator 23 can calculate the complex transfer function matrix from one subcarrier measured using the reception array antenna and receiver 22. The one subcarrier signal is represented as complex reception signal vector x=[x1, . . . , $x_{MR}$]. The complex transfer function vector can be calculated according to, for example, h0=x/s. Here, s denotes the complex transmission signal, and is assumed to be known. It should be noted that the calculated complex transfer function matrix also includes reflected waves that did not pass via living body 50, such as direct waves and reflected waves derived from a fixed object.

The method of calculating complex transfer functions from one subcarrier includes, for example, a method of dividing a reception IQ symbol by a known signal such as a pilot signal or a guard interval signal.

Complex transfer function calculator 23 calculates the complex transfer function matrix for each of the S subcarrier signals, and outputs the obtained S complex transfer function matrices to moving body correlation matrix calculator 24.

It should be noted that complex transfer function calculator 23 may constantly calculate the complex transfer function matrix, either continuously or regularly, using each of the subcarriers outputted by receiver 22. By adopting this configuration, when estimating device 10 shares the hardware of a communication device, the complex transfer function matrix that is normally calculated for use in processing by the communication device can also be used by estimating device 10.

[Moving Body Correlation Matrix Calculator 24]

Moving body correlation matrix calculator 24 records sequentially in time series, which is the order in which the plurality of reception signals are measured, the plurality of complex transfer function matrices calculated by complex transfer function calculator 23, for each of the subcarriers and each of the M×N combinations. Then, moving body correlation matrix calculator 24 extracts, for each of the subcarriers and each of the M×N combinations, components of the moving body from the plurality of complex transfer function matrices recorded in time series, to thereby calculate, for each of the subcarriers, a moving body correlation matrix expressed by a M×N-dimension matrix.

Here, the moving body correlation matrix is the extracted reflected wave or dispersed wave (living body component) included in the reception wave that passed via living body 50. The method of calculating the living body component from the complex transfer functions recorded in time series include a method which uses Fourier transform disclosed in PTL 1 and a method which uses difference information disclosed in PTL 2. In this embodiment, a method which uses difference information will be specifically described. Although, the subsequently described procedure is performed on all of the complex transform function matrices calculated for the respective subcarriers, all are expressed by the same numerical expression and procedure, and thus the procedure for calculating the moving body correlation matrix of one subcarrier, as a representative, will be described.

First, moving body correlation matrix calculator 24 calculates the difference information of the plurality of complex transfer functions recorded in time series, for each of the subcarriers and each of the M×N combinations. Specifically, moving body correlation matrix calculator 24 calculates at least two pieces of difference information each of which is expressed by a M×N-dimension matrix and indicates the difference between two complex transfer functions at two time points of a predetermined interval, among the plurality of complex transfer functions. Moving body correlation matrix calculator 24 calculates a moving body correlation matrix by using the at least two pieces of difference information calculated. Here, the start points out of the two time points of a predetermined interval for the at least two pieces of difference information are different times. Furthermore, the predetermined interval may be approximately half the cycle derived from living body 50 (living body fluctuation cycle).

Figure 4:
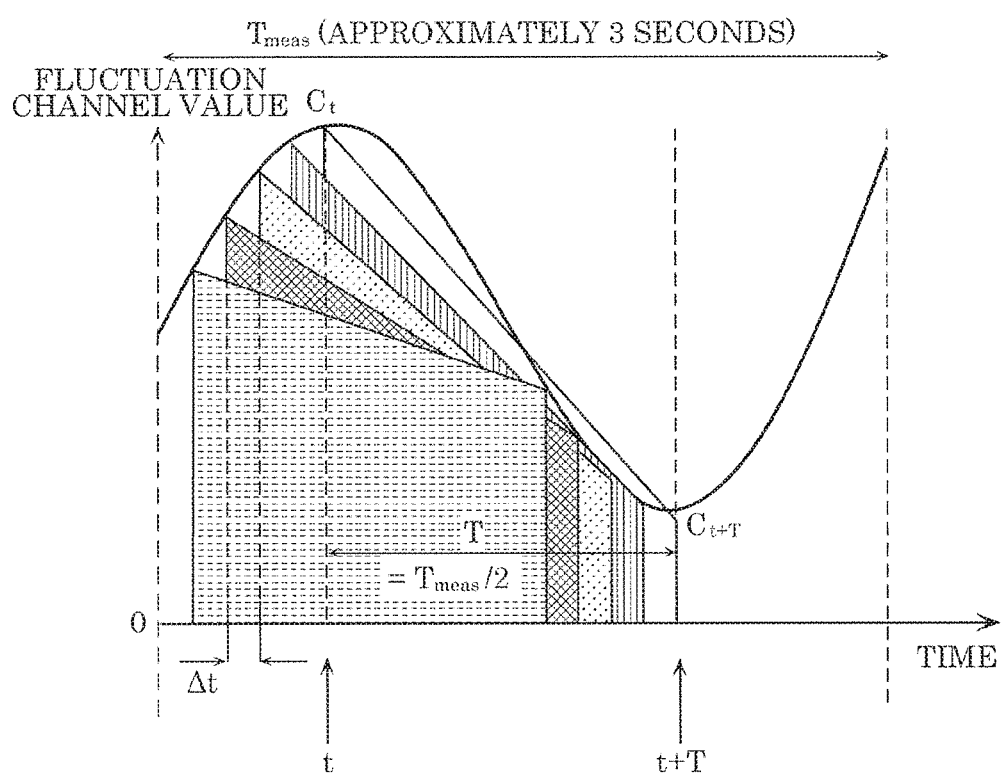
FIG. 4 is a conceptual diagram illustrating an example of two time points having a predetermined interval used when calculating difference information in the embodiment.
Figure 5:
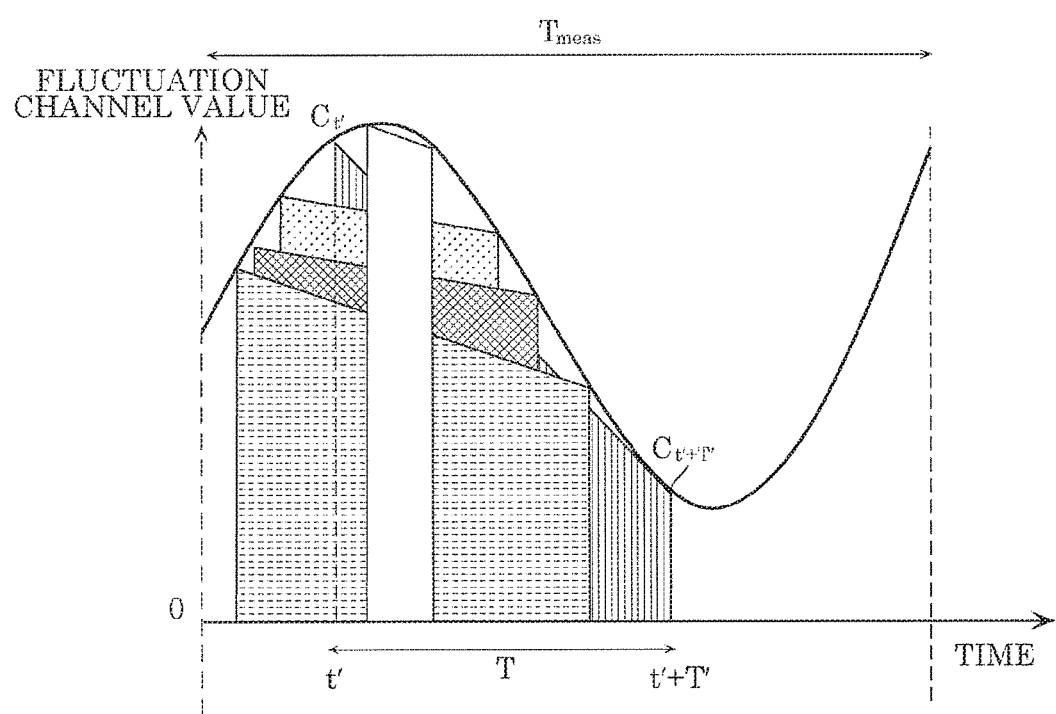
FIG. 5 is a conceptual diagram illustrating an example of two time points having a predetermined interval different from that in FIG. 4.

FIG. 4 is a conceptual diagram illustrating an example of two time points of a predetermined interval used when calculating difference information in this embodiment. FIG. 5 is a conceptual diagram illustrating an example of two time points of a predetermined interval different from that in FIG. 4. In FIG. 4, the vertical axis indicates channel fluctuation value and the horizontal axis indicates time. Furthermore, $T_{meas}$ indicates the measurement time for a reception signal. This measurement time $T_{meas}$ is the first period described earlier. Measurement time $T_{meas}$ is equivalent to the living body fluctuation maximum cycle which includes at least one of, for example, the respiration, heartbeat, and body motion of the living body, that is, a maximum cycle derived from the living body fluctuation. In the example in FIG. 4, the measurement time is approximately 3 seconds which is equivalent to the cycle of the respiration activity of living body 50.

When a plurality of complex transfer functions calculated from the reception signals measured by receiver 22 in measurement time $T_{meas}$ such as that illustrated in FIG. 4, that is, when channel fluctuation values, are recorded sequentially, measurement time $T_{meas}$ is equivalent to the living body fluctuation maximum cycle, and thus the maximum value and the minimum value of the fluctuation of living body 50 is certainly included in measurement time Here, where living body fluctuation maximum cycle is Tmax, and the minimum cycle derived from living body fluctuation (living body fluctuation minimum cycle) is Tmin, the time difference between their half cycles Tmax/2 and Tmin/2 become the time difference corresponding to the fluctuation of living body 50. For this reason, predetermined interval T when calculating the difference information of the complex transfer function can be set in a range Tmax/2≤T≤Tmin/2. In this manner, even if predetermined interval T is approximately half of the cycle derived from living body 50 (living body fluctuation cycle), the living body-derived component can be extracted from a time-varying channel for 1 cycle of living body 50.

Furthermore, in the example illustrated in FIG. 4, moving body correlation matrix calculator 24 calculates the difference information indicating the difference between the complex transfer functions at different times such as, for example, time t and time t+T, that is, at the two time points of predetermined interval T. Then, moving body correlation matrix calculator performs the calculation of the difference information a plurality of times with predetermined intervals T having times offset by Δt as start points. Specifically, moving body correlation matrix calculator 24 further performs such a difference information calculation (on a set of different complex transfer functions) at predetermined intervals T of two different time points. Here, the difference information is calculated because complex transfer function components that passed via a fixed object that is not living body 50 are removed and only complex transfer function components that passed via living body 50 remain.

In this embodiment, the number of transmission antenna elements and the number of reception antenna elements are both greater than or equal to two (that is, a plurality). As such, the number of differential values (pieces of difference information) of the complex transfer functions corresponding to transmission antenna 11 and reception antenna 21 becomes (number of transmission antenna elements: $M_T$)× (number of reception antenna elements: $M_R$), and is collectively defined as complex difference channel matrix H (l, m). Complex transfer function calculator 23 calculates, as difference information, complex difference channel matrix H (l, m) expressed below.

$$H(l, m) = \begin{bmatrix} h_{11}(l, m) & \cdots & h_{1M_T}(l, m) \\ \vdots & \ddots & \vdots \\ h_{M_R 1}(l, m) & \cdots & h_{M_R M_T}(l, m) \end{bmatrix}$$ [Math. 1]

Here 1≤l, m≤N (where l≠m, and N is the total number of measurements). Furthermore, each of l and m is a positive integer representing a measurement number, and is a sample time.

The elements of the aforementioned complex difference channel matrix H (l, m) are rearranged, and the complex difference channel having $M_R M_T \times 1$ in (Equation 1) as a vector is calculated.

[Math. 2]

$$h_v(l, m) = vec(H(l, m))$$ (Equation 1)
$$= \begin{bmatrix} h_{11}(l, m), \ldots, h_{M_R 1}(l, m), h_{12}(l, m), \ldots, \\ h_{M_R 2}(l, m), \ldots, h_{M_R M_T}(l, m) \end{bmatrix}^T$$

Here, vec(•) represents conversion to the vector of the matrix, and HT represents transposition. It should be noted that, in the example illustrated in FIG. 4, N is the number of channel measurements, and corresponds to the number of vertices of a trapezoid including two time points of time interval T such as $C_t$ and $C_{t+T}$ (i.e., data used in arithmetic operation). In the case where measurement time is 3 seconds and measurement is performed 100 times, N=300.

As illustrated in FIG. 3, the complex transfer function vector calculated by complex transfer function calculator 23 includes reflected waves that did not pass via living body 50, such as direct waves and reflected waves derived from a fixed object. On the other hand, in the complex difference channel vector, all the reflected waves that did not pass via living body 50 are removed by the difference arithmetic operation on the complex transfer function vectors at two time points, and only reflected waves derived from the living body are included. Although there is also the advantage that, when this difference arithmetic operation is performed, the complex transfer function of the reflected waves derived from living body 50 are also subtracted, the complex difference channel vector does not become perfectly zero because the amplitude or phase of the reflected waves that passed via living body 50 constantly time-vary due to living body activities such as respiration, heartbeat, etc. Specifically, when the complex transfer function vectors of two different time points are subtracted, a result obtained by multiplying the complex transfer function vector that passed via living body 50 by a coefficient is left behind.

It should be noted that moving body correlation matrix calculator 24 calculates the difference information for a plurality of sets (complex transfer functions of two different time points) in order to weaken the influence of instantaneous noise and improve the accuracy of direction estimation by getting the average a plurality of times, as described later. Moreover, predetermined interval T when performing difference information calculation may be any predetermined interval, that is, for example, predetermined interval T' of two time points such as time t' and time t'-T' as in FIG. 5, and not a fixed value as illustrated in FIG. 4.

Next, moving body correlation matrix calculator 24 calculates the correlation matrix thereinafter referred to as "instantaneous correlation matrix") indicated in (Equation 2) from the complex difference channel vector. The instantaneous correlation matrix is referred to as such because the difference time, which is the two time points of the predetermined interval, is instantaneous.

[Math. 3]

$$R_I(l,m) = h_v(l,m) h_v^H(l,m) \quad \text{(Equation 2)}$$

Here, $[\bullet]^H$ represents complex conjugate transposition.

Furthermore, moving body correlation matrix calculator 24 may further average (perform an averaging arithmetic operation on) the instantaneous correlation matrix as indicated in (Equation 3). As described above, this makes it possible to weaken the influence of instantaneous noise and improve the accuracy of direction estimation,

[Math. 4]

$$R = \frac{1}{N(N-1)} \sum_{l=1}^{N} \sum_{m=1(m \neq l)}^{N} R_i(l,m) \quad \text{(Equation 3)}$$

Here, aside from improving estimation accuracy compared to when the instantaneous correlation matrix according to (Equation 2) is used, using the correlation matrix according to (Equation 3) enables simultaneous estimation of a plurality of incoming waves. A correlation matrix that is calculated in this manner using (Equation 3) is called a moving body correlation matrix.

Moving body correlation matrix calculator 24 calculates the moving body correlation matrix obtainable using the above-described procedure, for each of the S subcarriers, and outputs these to subcarrier integrator 25. Since the complex transfer functions that passed via living body 50 are frequency-dependent and different for each subcarrier, the S moving body correlation matrices calculated here have mutually different components.

[Subcarrier Integrator 25]

Subcarrier integrator 25 calculates an integrated moving body correlation matrix which is a new moving body correlation matrix, by integrating the S moving body correlation matrices obtained through the calculation by moving body correlation matrix calculator 24 for the S subcarriers. Methods of integrating moving body correlation matrices include (i) a method of averaging the respective components of the moving body correlation matrices, (ii) a method of obtaining the median of the respective components of the moving body correlation matrices, and (iii) a method of calculating the absolute values of the moving body correlation matrices, determining a subcarrier having a large absolute value and a subcarrier having a small absolute value as having a large noise component other than the living body and excluding their moving body correlation matrices at a predetermined proportion, and averaging the remaining moving body correlation matrices. In this embodiment, the method of averaging the respective components will be described using numerical formulas.

In this manner, subcarrier integrator 25 may calculate the integrated moving body correlation matrix by calculating a per subcarrier average for the plurality of moving body correlation matrices calculated for the plurality of subcarriers. In this case, subcarrier integrator 25 calculates the integrated moving body correlation matrix by adding up, for each of the M×N components of the S moving body correlation matrices obtained for the S subcarriers, the S components belonging to the component, and dividing the added up value by S.

Furthermore, subcarrier integrator 25 may calculate the integrated moving body correlation matrix by calculating a median of each set of corresponding components among the plurality of moving body correlation matrices calculated for the plurality of subcarriers. In this case, subcarrier integrator 25 calculates the integrated moving body correlation matrix y specifying, for each of the M×N components of the S moving body correlation matrices obtained for the S subcarriers, the median of the S components belonging to the component.

When the moving body correlation matrix calculated for each of the subcarriers by moving body correlation matrix calculator 24 is denoted as $R_i$ (i is the subcarrier number), subcarrier integrator 25 performs averaging as indicated in (Equation 4) below.

[Math. 5]

$$\overline{R} = \frac{1}{S} \sum_{i=1}^{S} R_i \quad \text{(Equation 4)}$$

With this averaging, the components included in the S moving body correlation matrices obtained from the respective S subcarriers can be integrated into an integrated moving body correlation matrix which is a single matrix, and thus living body estimation accuracy can be improved.

[Estimation Processor 26]

Estimation processor 26 estimates the direction or the position in which the moving body is present relative to estimating device 10, using the integrated moving body correlation matrix calculated by subcarrier integrator 25. For position estimation, an arrival direction estimation algorithm such as multiple signal classification (MUSIC) or Capon is used. Here, an estimation method based on the MUSIC algorithm will be described.

The moving body correlation matrix after the subcarrier integration indicated in (Equation 4) can be written as follows when eigenvalue decomposition is performed.

$$R = U\Lambda U^H \quad \text{[Math. 6]}$$

$$U = [u_1, \ldots, u_L, u_{L+1}, \ldots, u_{M_R}] \quad \text{[Math. 7]}$$

$$\Lambda = \text{diag}[\lambda_1, \ldots, \lambda_L, \lambda_{L+1}, \ldots, \lambda_{M_R}] \quad \text{[Math. 8]}$$

Here, $$u_1, \ldots, u_{M_R} \quad \text{[Math. 9]}$$

are eigenvectors having number of elements $M_R$, $$\lambda_1, \ldots, \lambda_{M_R} \quad \text{[Math. 10]}$$

are eigenvalues corresponding to the eigenvectors, and $$\lambda_1 \geq \lambda_2 \geq \ldots \geq \lambda_L, \lambda_{L+1} \geq \ldots \geq \lambda_{M_R} \qquad [\text{Math. 11}]$$

is satisfied, where L is the number or arriving waves, that, is, the number of living bodies that are detection targets.

Furthermore, the steering vector (direction vector) of the transmission array antenna is defined as:

$$a_T(\theta_T) = [1, e^{-jkd\sin\theta_T}, \ldots, e^{-jkd(M_T-1)\sin\theta_T}]^T \qquad [\text{Math. 12}]$$

The steering vector (direction vector) of the reception array antenna is defined as:

$$a_R(\theta_R) = [1, e^{-jkd\sin\theta_R}, \ldots, e^{-jkd(M_R-1)\sin\theta_R}]^T \qquad [\text{Math. 13}]$$

Here, k is the number of waves. In addition, these steering vector are multiplied with each other, and a steering vector that takes into consideration the angle information of both the transmission and the reception array antenna is obtained as indicated in Math 14.

$$a(\theta_T, \theta_R) = \text{vec}\{a_r(\theta_r) a_R^T(\theta_R)\} \qquad [\text{Math. 14}]$$

Then, the MUSIC method is applied to the obtained steering vector.

Specifically, estimation processor 26 can estimate the direction of a transmission wave and the direction of an arriving wave by searching for the maximum value of evaluation function Pmusic(θ) indicated below, based on the MUSIC method and using the calculated steering vector.

$$P_{music}(\theta) = \frac{1}{|a^H(\theta_T, \theta_R)[u_{L+1}, \ldots, u_{M_R}]|^2} \qquad [\text{Math. 15}]$$

In this embodiment, since it is necessary to perform the search for the maximum value of the evaluation function for two angles ($\theta_R$ and $\theta_R$), two-dimensional search processing is carried out. Then, estimation processor 26 estimates the transmission direction of a transmission wave to living body 50 and the arrival direction of a reflected wave from living body 50, from the two angles ($\theta_T$ and $\theta_R$) obtained in this manner, and estimates the position of living body 50 from the intersection of the two directions that were estimated.

[Operation of Estimating Device 10]

Figure 6:
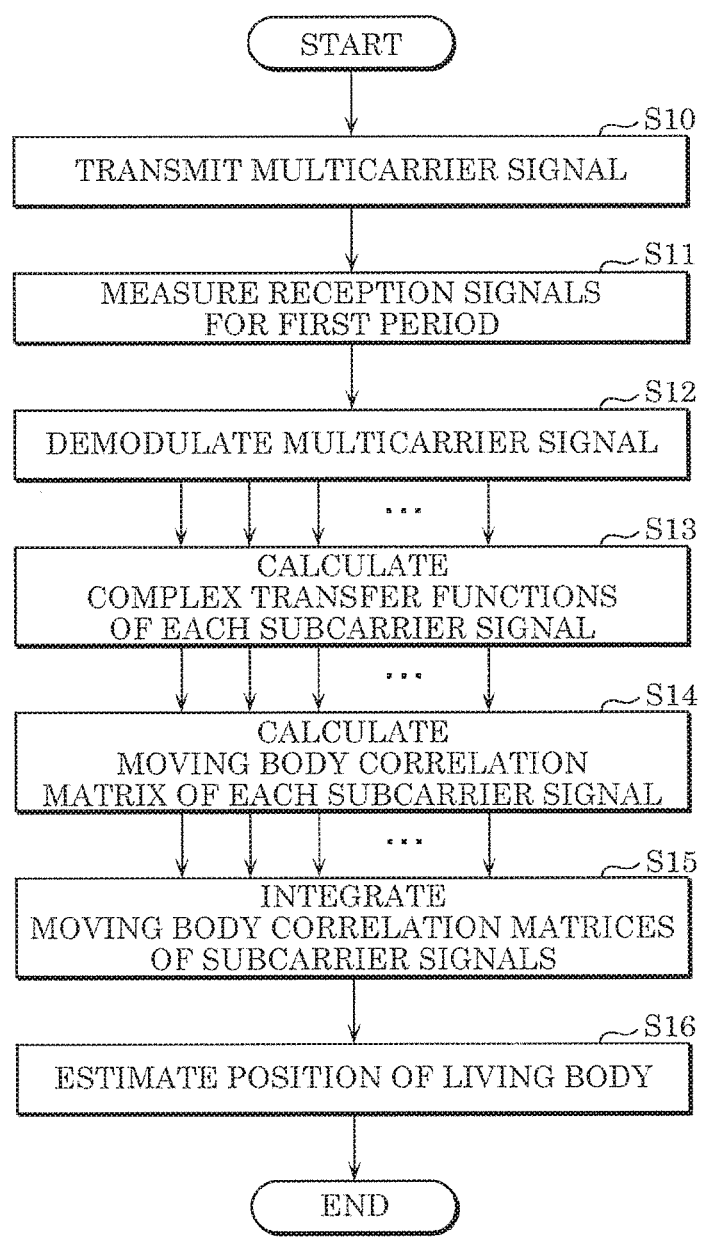
FIG. 6 is a flowchart illustrating the estimation process by the estimating device according to the embodiment.

The operation in the estimation processing by estimating device 10 configured in the above-described manner will be described. FIG. 6 is a flowchart illustrating an estimation processing by estimating device 10 according to this embodiment.

First, estimation device 10 transmits a multicarrier signal obtained by modulating S subcarriers, from the $M_T$ transmission antenna elements (S10).

Then, estimating device 10 measures reception signals including reflected signals reflected or dispersed by living hod 50, for a first period corresponding to a cycle of movement of the moving body (S11).

Next, estimating device 10 demodulates S subcarriers by performing multicarrier demodulation on the reception signals measured in the first period (S12).

Next, estimating device 10 calculates, for each of the S subcarriers, complex transfer functions indicating the propagation characteristics between the respective transmission antenna elements and respective reception antenna elements, using the reception signals measured in the first period by receiver 22 (S13). These processes are performed on the respective subcarriers in parallel or sequentially. Since, the details are as described above, description will be omitted here. The same applies for the following.

Next, estimating device 10 calculates a moving body correlation matrix for each of the S subcarriers by extracting components related to the moving body from the complex transfer functions of each of the S subcarriers (S14). This process has been described as the processing by moving body correlation matrix 24, and thus detailed description will be omitted. Accordingly, S moving body correlation matrices are obtained.

Next, estimating device 10 calculates an integrated moving body correlation matrix by integrating the S moving body correlation matrices calculated and obtained for the respective S subcarriers (515). This process has been described as the processing by subcarrier integrator 25, and thus detailed description will be omitted.

Then, estimating device estimates the direction or position in which living body 50 is present using the calculated integrated moving body correlation matrix relative to the estimating device 10 (516). In other words, estimating device 10 estimates the direction or position in which living body 50 is present relative to estimating device 10. This process has been described as the processing by estimating processor 26, and thus detailed description will be omitted.

[Effects, Etc.]

According to estimating device 10 and the estimating method according to this embodiment, by using a multicarrier signal such as an OFDM signal as a transmission signal, it is possible to make use of an existing multicarrier transceiver and estimate the direction or position in which living body 50 is present relative to estimating device 10. For example, as an existing communication device, OFDM receivers are already widely used as cellular phones, television broadcast receivers, wireless LAN devices, etc., and thus cost lower that when a non-modulated signal is used.

Furthermore, in estimating device 10, the direction or position in which living body 50 is present relative to estimating device 10 is estimated using an integrated moving body correlation matrix obtained by integrating the plurality of moving body correlation matrices obtainable for the plurality of subcarriers. As such, compared to when a single subcarrier is used, highly accurate living body position estimation is possible. In particular, in this embodiment, by calculating the average of the plurality of moving body correlation matrices that can be obtained corresponding to the plurality of subcarriers, instead of the average of complex transfer functions that may cancel out the fluctuation of living body 50, the moving body information included in the moving body correlation matrices of the respective subcarriers are superposed and processed all at once by estimation processor 26 disposed at a subsequent stage. Accordingly, according to calculations, matrix rank can be restored, and the calculation result, that is, direction r position estimation accuracy can be improved.

(Modification 1)

Estimating device 10 according to the foregoing exemplary embodiment is exemplified as a device that uses the multiple-input and multiple-output (MIMO) form in which both the transmission antenna element and the reception antenna element are plural in number, but is not limited to such. The estimating device may be a device that uses the single-input and multiple-output (SIMO) or multiple-input and single-output (MISO) form in which one of the transmission antenna element and the reception antenna element is a single antenna element.

In this case, each matrix described in the exemplary embodiment takes the form of a vector but the same arithmetic operation can be applied, and eventually the direction of living body 50 relative to the estimating device can be estimated.

[Effects, Etc.]

According to this modification, by making the transmission antenna element or reception antenna element singular in number, hardware and signal processing calculation amount can be reduced. As such, when information regarding the position of living body 50 relative to the estimating device is not required and information regarding the direction of living body 50 is required, low cost, implementation is possible compared to the MIMO form.

(Modification 2)

In moving body correlation matrix calculator 24 according to the foregoing exemplary embodiment, the process of extracting the components related, to the moving body for each reception signal of the respective subcarriers is performed by calculating difference information. Furthermore, PTL 1 also discloses a method that is performed using Fourier transform. However, both methods require arithmetic operations having a large amount of calculation such as Fourier transform or plural iterations of difference calculation, which becomes a problem in the case of implementing using a commercially available inexpensive device. In this modification, the process of extracting moving body components is realized using processing having a small amount of calculation.

[Moving Body Correlation Matrix Calculator 24 According to Modification 2]

Figure 7:
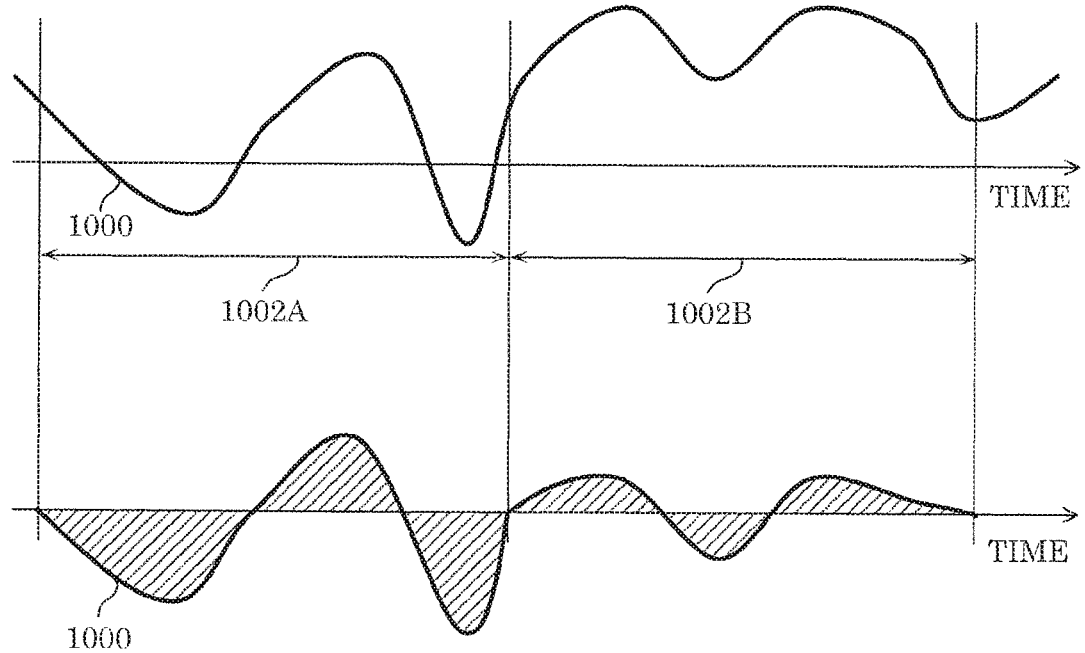
FIG. 7 is a diagram schematically illustrating signal processing of a moving body correlation matrix calculation according to Modification 2.

The operation of moving body correlation matrix calculator 24 according to this modification is described following the reception waveform outline diagram illustrated in FIG. 7. It should be noted that although the moving body correlation matrix calculation process described, below is performed on all of the subcarriers, since the same operation is carried out for all, the procedure for calculating the moving body correlation matrix of a single subcarrier as a representative will be carried out.

First, moving body correlation matrix calculator 24 calculates an average value in a second period of complex transform functions (waveform indicated by 1000 in FIG. 7) outputted by complex transform correlation calculator 23. Here, the second period is, for example, a period that is the same as or longer than the first period which corresponds to a cycle derived from an activity of living body 50. In FIG. 7, the second period is represented by the two sections 1002A and 1002B. The average value that is to be calculated here is equivalent to a complex transform function component that passed via a fixed object that is not living body 50. It should be noted that, in order to flexibly respond to changes in the environment, that is not the living body, the length of the period may be made variable based on the amplitude of the complex transfer function.

Next, moving body correlation matrix calculator 24 calculates the complex transfer functions from which complex transfer functions that passed via a fixed object that is not living body 50 (waveform indicated by 1001 in FIG. 7) have been removed, by subtracting the aforementioned average value from the original complex transfer function.

Then, moving body correlation, matrix calculator 24 extracts the fluctuation component corresponding to the living body component included in the aforementioned complex transfer functions. More specifically, a value obtained by integrating the amplitude indicated at the bottom in FIG. 7 along the temporal direction (the area of the shaded portions of the waveform indicated by 1001 in FIG. 7), the root mean square, the average absolute value, and so on can be given. The integrated value, root mean square, average absolute value, etc., are information equal to the moving body correlation index in the exemplary embodiment.

Specifically, moving body correlation matrix calculator 24 calculates, for each of the subcarriers and each of the M×N combinations, an average value of the plurality of complex transfer functions recorded sequentially in time series in a second period, subtracts the average value from each of the plurality of complex transfer functions in the second period, and calculates the moving body correlation matrix using the obtained subtraction result. The moving body correlation matrices calculated for the subcarriers, respectively, in the above manner are outputted to subcarrier integrator 25, are processed in the same manner as in the exemplary embodiment, and used in estimating the direction or position of living body 50 relative to estimating device 10. Specifically, the estimating device in this case includes: a transmission antenna including M transmission antenna elements, where M is a natural number greater than or equal to 1, and M is greater than or equal to 2 when N is 1; a transmission signal generator that generates a transmission signal; a transmitter that causes the transmission antenna to transmit the transmission signal, by outputting the transmission signal to the transmission antenna; a reception antenna including N reception antenna elements, where N is a natural number greater than or equal to 1, and N is greater than or equal to 2 when M is 1; a receiver that measures, for a first period equivalent to a cycle of movement by the moving body, a plurality of reception signals which are received by each of the N reception antenna elements and include a reflected signal which is the transmission signal transmitted from each of the M transmission antenna elements that has been reflected or dispersed by the moving body; a complex transfer function calculator that calculates, using the plurality of reception signals measured by the receiver in the first period, a plurality of complex transfer functions indicating a propagation characteristic between a transmission antenna element and a reception antenna element in each of M×N combinations obtainable when the M transmission antenna elements and the N reception antenna elements are combined on a one-to-one basis; a moving body correlation matrix calculator that calculates a moving body correlation matrix having M rows×N columns by (i) recording sequentially in time series, which is an order in which the plurality of reception signals are measured, the plurality of complex transfer functions calculated by the complex transfer function calculator, (ii) calculating an average value of the plurality of complex transfer functions recorded sequentially in time series in a second period, and (iii) subtracting the average value from each of the plurality of complex transfer functions in the second period, the (i) recording, the (ii) calculating, and the (iii) subtracting being performed for each of the M×N combinations; and an estimation processor that estimates the direction or the position which the moving body is present relative to the estimating device, using the moving body correlation matrix calculated by the moving body correlation matrix calculator.

It should be noted that the operation of moving body correlation matrix calculator 24 in this modification is not limited to when a multicarrier signal is used for the transmission wave, and the same is true when a single carrier is used.

[Effects, Etc.]

According to this modification, moving body correlation matrix calculator 24 can calculate the moving body correlation matrix using simple calculation such as averaging and subtraction, without having to perform complex calculations such as Fourier transform, a plurality of difference calculations, etc. As such, the processing load for calculating a moving body correlation matrix can be reduced. Furthermore, compared to when waveform for a time when no person is present, etc., is prepared in advance as the component to be subtracted, the component to be subtracted is generated from the most recent reception waveform, and thus this modification can also detect a change in the environment such as the opening/closing of a door is also possible.

As described above, according to the present disclosure, it is possible to realize an estimating device and an estimating method that are capable of quickly and accurately estimating the direction or position in which a moving object is present; relative to the own device, using radio signals.

Although an estimating device and an estimating method according to an aspect of the present disclosure has been described up to this point based on exemplary embodiments, the present disclosure is not limited to these exemplary embodiments. Various modifications to the exemplary embodiments that can be conceived by a person of ordinary skill in the art or forms Obtained by combining structural components of different exemplary embodiments, for as long as they do not depart from the essence of the present disclosure, are included in the scope of the present disclosure.

For example, although estimation of the direction or position of living body 50 is described as an example in the foregoing exemplary embodiment and Modifications 1 and 2 thereof, the target of the estimation process is not limited to living body 50. The target of the estimation process in the case where a high-frequency signal is emitted may be various moving bodies (machines, etc.) whose activity or movement imparts a Doppler effect on the reflected wave.

Furthermore, the present invention can be realized, not only as an estimating device including such characteristic structural components, but also as an estimating method including as steps the characteristic structural components included in the estimation device. Furthermore, the present invention can also be realized as a computer program that causes a computer to execute the respective steps included in such a method. In addition, it should be obvious that such a program can be distributed via a non-transitory computer-readable recording medium such as CD-ROM or a communication network such as the Internet.

INDUSTRIAL APPLICABILITY

The present disclosure can be used in an estimating device and an estimating method for estimating the direction or position of a moving body using radio signals, and can be used particularly as a positioning sensor and a direction estimating method provided in a measuring device that measures the direction or position of a moving body including a living body and a machine, a household appliance that performs control according to the direction or position of a moving body, a monitoring device or the like that detects incursion of a moving body, etc.

What is claimed is:

1. An estimating device that estimates a direction or a position in which a moving body is present, the estimating device comprising:
    a transmission antenna including M transmission antenna elements, where M is a natural number greater than or equal to 1, and M is greater than or equal to 2 when N is 1;
    a transmission signal generator that generates a multicarrier signal obtained by modulating a plurality of subcarrier signals;
    a transmitter that causes the transmission antenna to transmit the multicarrier signal, by outputting the multicarrier signal to the transmission antenna;
    a reception antenna including N reception antenna elements, where N is a natural number greater than or equal to 1, and N is greater than or equal to 2 when M is 1;
    a receiver that measures, for a first period equivalent to a cycle of movement by the moving body, a plurality of reception signals which are received by each of the N reception antenna elements and include a reflected signal which is the multicarrier signal transmitted from each of the M transmission antenna elements that has been reflected or dispersed by the moving body;
    a complex transfer function calculator that calculates a plurality of complex transfer functions for each of a plurality of subcarriers to which the plurality of subcarrier signals correspond, using the plurality of reception signals measured by the receiver in the first period, the plurality of complex transfer functions indicating a propagation characteristic between a transmission antenna element and a reception antenna element in each of M×N combinations obtainable when the M transmission antenna elements and the N reception antenna elements are combined on a one-to-one basis;
    a moving body correlation matrix calculator that calculates, for each of the plurality of subcarriers, a moving body correlation matrix having M rows×N columns by (i) recording sequentially in time series, which is an order in which the plurality of reception signals are measured, the plurality of complex transfer functions calculated by the complex transfer function calculator and (ii) extracting components relating to the moving body from the plurality of complex transfer functions recorded sequentially in time series, the (i) recording and the (ii) extracting being performed for each of the plurality of subcarriers and each of the M×N combinations;
    a subcarrier integrator that calculates an integrated moving body correlation matrix by integrating, according to a predetermined method, the plurality of moving body correlation matrices calculated for the plurality of subcarriers; and
    an estimation processor that estimates the direction or the position in which the moving body is present relative to the estimating device, using the integrated moving body correlation matrix calculated by the subcarrier integrator.

2. The estimating device according to claim 1, wherein the moving body correlation matrix calculator calculates at least two pieces of difference information each indicating a difference between two complex transfer functions at two time points of a predetermined interval, among the plurality of complex transfer functions recorded sequentially in time series for each of the plurality of subcarriers and each of the M×N combinations, and calculates the moving body correlation matrix using the at least two pieces of difference information calculated.

3. The estimating device according to claim 1, wherein the moving body correlation matrix calculator calculates an average value of the plurality of complex transfer functions recorded sequentially in time series for each of the plurality of subcarriers and each of the M×N combinations, in a second period, subtracts the average value from each of the plurality of complex transfer functions in the second period, and calculates the moving body correlation matrix using a subtraction result that is obtained.

4. The estimating device according to claim 1, wherein the subcarrier integrator calculates the integrated moving body correlation matrix by calculating a per subcarrier average for the plurality of moving body correlation matrices calculated for the plurality of subcarriers.

5. The estimating device according to claim 1, wherein the subcarrier integrator calculates the integrated moving body correlation matrix by calculating a median of each set of corresponding components among the plurality of moving body correlation matrices calculated for the plurality of subcarriers.

6. The estimating device according to claim 1, wherein the multicarrier signal is an orthogonal frequency division multiplexing (OFDM) signal.

7. An estimating device that estimates a direction or a position in which a moving body is present, the estimating device comprising:
   a transmission antenna including M transmission antenna elements, where M is a natural number greater than or equal to 1, and M is greater than or equal to 2 when N is 1;
   a transmission signal generator that generates a transmission signal;
   a transmitter that causes the transmission antenna to transmit the transmission signal, by outputting the transmission signal to the transmission antenna;
   a reception antenna including N reception antenna elements, where N is a natural number greater than or equal to 1, and N is greater than or equal to 2 when M is 1;
   a receiver that measures, for a first period equivalent to a cycle of movement by the moving body, a plurality of reception signals which are received by each of the N reception antenna elements and include a reflected signal which is the transmission signal transmitted from each of the M transmission antenna elements that has been reflected or dispersed by the moving body;
   a complex transfer function calculator that calculates, using the plurality of reception signals measured by the receiver in the first period, a plurality of complex transfer functions indicating a propagation characteristic between a transmission antenna element and a reception antenna element in each of M×N combinations obtainable when the M transmission antenna elements and the N reception antenna elements are combined on a one-to-one basis;
   a moving body correlation matrix calculator that calculates a moving body correlation matrix having M rows×N columns by (i) recording sequentially in time series, which is an order in which the plurality of reception signals are measured, the plurality of complex transfer functions calculated by the complex transfer function calculator, (ii) calculating an average value of the plurality of complex transfer functions recorded sequentially in time series in a second period, and (iii) subtracting the average value from each of the plurality of complex transfer functions in the second period, the (i) recording, the (ii) calculating, and the (iii) subtracting being performed for each of the M×N combinations; and
   an estimation processor that estimates the direction or the position in which the moving body is present relative to the estimating device, using the moving body correlation matrix calculated by the moving body correlation matrix calculator.

8. An estimating method for use in an estimating device including a transmission antenna and a reception antenna, the transmission antenna including M transmission antenna elements, where M is a natural number greater than or equal to 1, and M is greater than or equal to 2 when N is 1, the reception antenna including N reception antenna elements, where N is a natural number greater than or equal to 1, and N is greater than or equal to 2 when M is 1, the estimating method comprising:
   generating a multicarrier signal obtained by modulating a plurality of subcarrier signals;
   causing the transmission antenna to transmit the multicarrier signal, by outputting the multicarrier signal to the transmission antenna;
   measuring, for a first period equivalent to a cycle of movement by a moving body, a plurality of reception signals which are received by each of the N reception antenna elements and include a reflected signal which is the multicarrier signal transmitted from each of the M transmission antenna elements that has been reflected or dispersed by the moving body;
   calculating a plurality of complex transfer functions for each of a plurality of subcarriers to which the plurality of subcarrier signals correspond, using the plurality of reception signals measured in the first period, the plurality of complex transfer functions indicating a propagation characteristic between a transmission antenna element and a reception antenna element in each of M×N combinations obtainable when the M transmission antenna elements and the N reception antenna elements are combined on a one-to-one basis;
   calculating, for each of the plurality of subcarriers, a moving body correlation matrix having M rows×N columns by (i) recording sequentially in time series, which is an order in which the plurality of reception signals are measured, the plurality of complex transfer functions calculated and (ii) extracting components relating to the moving body from the plurality of complex transfer functions recorded sequentially in time series, the (i) recording and the (ii) extracting being performed for each of the plurality of subcarriers and each of the M×N combinations;
   calculating an integrated moving body correlation matrix by integrating, according to a predetermined method, the plurality of moving body correlation matrices calculated for the plurality of subcarriers; and
   estimating a direction or a position in which the moving body is present relative to the estimating device, using the integrated moving body correlation matrix calculated.

9. An estimating method for use in an estimating device including a transmission antenna and a reception antenna, the transmission antenna including M transmission antenna elements, where M is a natural number greater than or equal to 1, and M is greater than or equal to 2 when N is 1, the reception antenna including N reception antenna elements, where N is a natural number greater than or equal to 1, and N is greater than or equal to 2 when M is 1, the estimating method comprising:
   generating a transmission signal;
   causing the transmission antenna to transmit the transmission signal, by outputting the transmission signal to the transmission antenna;

measuring, for a first period equivalent to a cycle of movement by a moving body, a plurality of reception signals which are received by each of the N reception antenna elements and include a reflected signal which is the transmission signal transmitted from each of the M transmission antenna elements that has been reflected or dispersed by the moving body;

calculating, using the plurality of reception signals measured in the first period, a plurality of complex transfer functions indicating a propagation characteristic between a transmission antenna element and a reception antenna element in each of M×N combinations obtainable when the M transmission antenna elements and the N reception antenna elements are combined on a one-to-one basis;

calculating a moving body correlation matrix having M rows×N columns by (i) recording sequentially in time series, which is an order in which the plurality of reception signals are measured, the plurality of complex transfer functions calculated, (ii) calculating an average value of the plurality of complex transfer functions recorded sequentially in time series in a second period, and (iii) subtracting the average value from each of the plurality of complex transfer functions in the second period, the (i) recording, the (ii) calculating, and the (iii) subtracting being performed for each of the M×N combinations; and estimating a direction or a position in which the moving body is present relative to the estimating device, using the moving body correlation matrix calculated.

\* \* \* \* \*